United States Patent [19]

Tzeng et al.

[11] Patent Number: 5,802,576
[45] Date of Patent: Sep. 1, 1998

[54] SPECULATIVE CACHE SNOOP DURING DMA LINE UPDATE

[75] Inventors: Allan Tzeng, San Jose; Jayabharat Boddu, Santa Clara, both of Calif.

[73] Assignee: Sun Microsystems, Inc., Palo Alto, Calif.

[21] Appl. No.: 677,011

[22] Filed: Jul. 1, 1996

[51] Int. Cl.$^6$ .................................................. G06F 12/00
[52] U.S. Cl. .................................................. 711/146; 711/213
[58] Field of Search .................................... 395/464, 444, 395/445, 449, 450, 460, 473, 495, 421.03, 421.08, 421.09

[56] References Cited

U.S. PATENT DOCUMENTS

| 5,511,226 | 4/1996 | Zilka | 395/473 |
| 5,577,227 | 11/1996 | Finnell et al. | 395/449 |
| 5,659,797 | 8/1997 | Zandveld et al. | 395/842 |

OTHER PUBLICATIONS

Jim Handy, "The Cache Memory Book", Academic Press, Inc., ISBN 0-12-322985-5, pp. 60-62, 1993.

*Primary Examiner*—Tod R. Swann
*Assistant Examiner*—Felix B. Lee
*Attorney, Agent, or Firm*—Townsend and Townsend and Crew LLP

[57] ABSTRACT

A method and apparatus for facilitating the streaming of data over a system bus between a memory and a DMA device. This is accomplished by doing a speculative cache look-up, or snoop, on a next cache line during or immediately following the access of a current cache line. This is done for DMA transfers when the first DMA address is received, and before subsequent addresses are received. Thus, a determination of whether the cache line is in the cache can be done in advance, allowing the next cache line of data to stream over the bus to or from the cache without waiting for the next address from the system bus or requiring a rearbitration for the system bus.

3 Claims, 4 Drawing Sheets

SPECULATIVE CACHE SNOOP DURING DMA LINE UPDATE

BACKGROUND OF THE INVENTION

The present invention relates to direct memory access (DMA) by peripheral devices connected to a computer system bus, and in particular to accesses in a cache memory.

A typical computer system architecture will include main memory, which is typically DRAM, along with cache memory. The cache memory is often in two levels, with a first level cache being integrated on the same chip as a microprocessor, and a second level cache being off-chip, typically implemented in fast SRAM chips. The microprocessor typically controls memory accesses, including ensuring that the cache contents are consistent with main memory. The microprocessor will issue the addresses and commands necessary to read or write from memory, whether it is main memory, the first level cache or the second level cache.

DMA transfers allow peripheral devices attached to the system bus to access memory without requiring a microprocessor to generate the addresses. This avoids tying up the microprocessor's time. On a DMA access, it is typically necessary to check the cache memories to see if the entry is there, to ensure that the most recent data is read, or to make sure that all entries are written to consistently. For an access to a cache, a DMA transfer typically requires a memory management unit, which may be in the microprocessor itself, to check the cache to see if the particular addressed data is there, and to do the reading and writing as necessary.

A system bus is typically slower than an internal microprocessor bus or a dedicated microprocessor to cache memory bus. A typical transfer of a group of data might arbitrate for the system bus with other users of the bus, and then send the data to the memory control unit, and subsequently release the bus until the memory control unit is ready for the next group of data. In some systems, the microprocessor or memory control unit may include a buffer for holding multiple cache lines which are transferred in a burst, with the bus subsequently being released, and the memory management unit doing the necessary cache checks and reads or writes.

In a multi-processor system, a number of processors may be connected to the same system bus, with each having its own cache memory, although typically sharing the same main memory. It is important to maintain memory consistency among all the caches. One technique for doing this involves each microprocessor snooping on the system bus write operations which might go to the cache of another microprocessor, so that it can determine if a write to another cache is occurring.

SUMMARY OF THE INVENTION

The present invention provides a method and apparatus for facilitating the streaming of data over a system bus between a memory and a DMA device. This is accomplished by doing a speculative cache look-up, or snoop, on a next cache line during or immediately following the access of a current cache line. This is done for DMA transfers when the first DMA address is received, and before subsequent addresses are received. Thus, a determination of whether the cache line is in the cache can be done in advance, allowing the next cache line of data to stream over the bus to or from the cache without waiting for the next address from the system bus or requiring a rearbitration for the system bus.

In one embodiment, a two cache line buffer is used in the microprocessor to receive the DMA data for a write operation. While the first line is being written to cache, the next line can be received from the system bus. Before the next line is received, a cache snoop will have been done to determine whether that cache line address is in the cache. If it is not in the cache, the data is redirected to the main memory.

The data streaming according to the present invention, in one embodiment, will be stopped when a page boundary is crossed or when the microprocessor requires priority access to the cache or to main memory (e.g., for a DRAM refresh). The invention also permits other accesses to the cache at the same time as the data streaming.

For a further understanding of the nature and advantages of the invention, reference should be made to the following description taken in conjunction with the accompanying drawings.

DETAILED DESCRIPTION OF THE PREFERRED EMBODIMENTS

Figure 1:
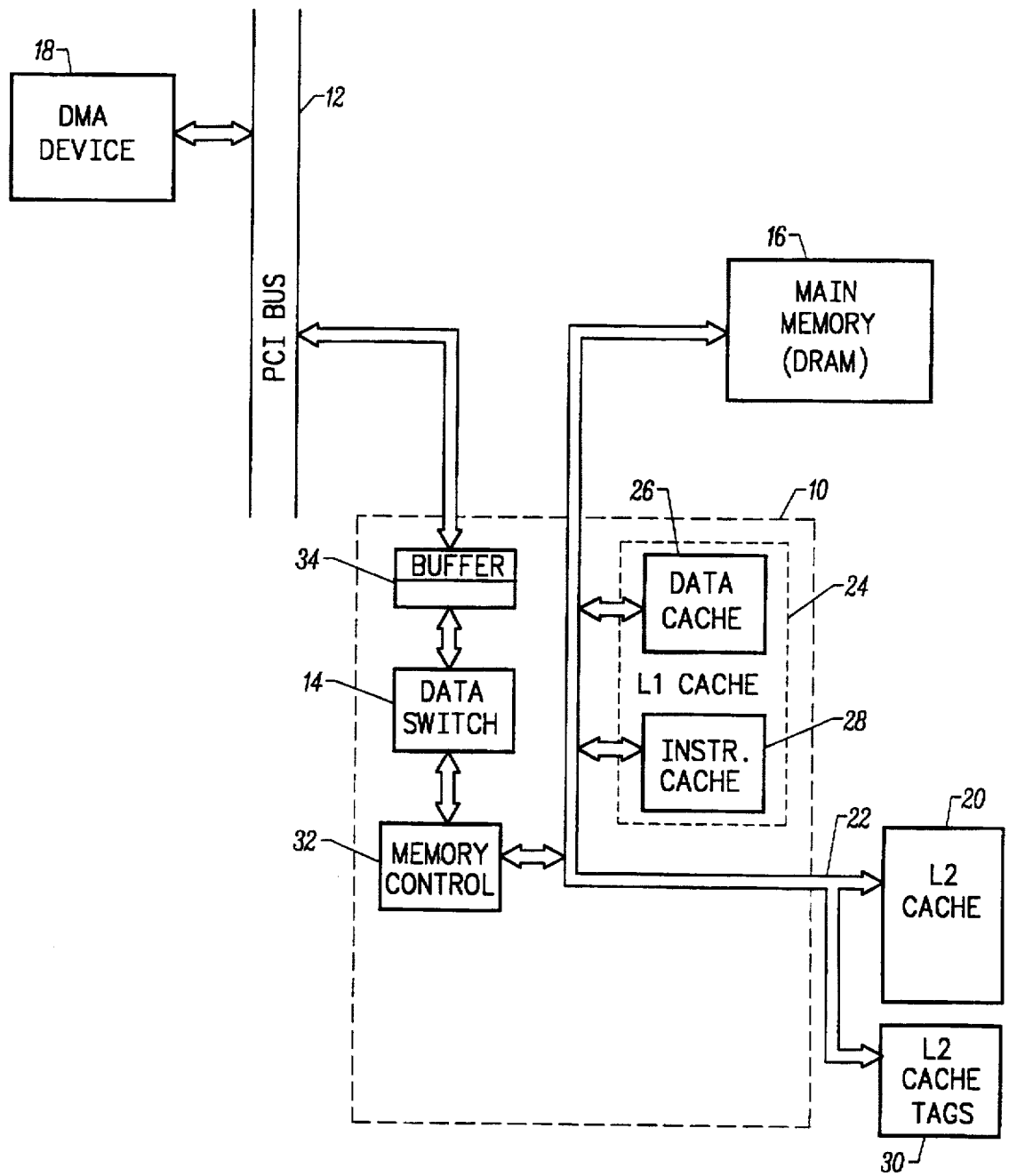
FIG. 1 is a block diagram of one embodiment of a computer system implementing the present invention.

FIG. 1 is a block diagram of an illustrative embodiment of a computer system according to the present invention. A microprocessor 10 is connected to a system bus 12, such as a PCI bus, through a buffer 34, which provides data to a data switch 14. Data switch 14 is connected to main memory 16, typically DRAM, through a memory control unit 32. Data switch 14 may be a bus controller and memory controller, for instance.

A DMA device 18 is connected to the system bus 12. Device 18 may be a disk drive, a graphics or sound board, or any other peripheral device connected to the system bus.

In the embodiment shown, microprocessor 10 is connected to an external cache 20 via a dedicated external cache bus 22. In the example shown, the external cache is a level 2 cache, with a level 1 cache 24 being provided on the microprocessor chip itself. L gel 1 cache 24 may be divided into a data cache 26 and an instruction cache 28. Also shown in the preferred embodiment are the tags for external cache 20 being stored in a tag memory 30. Access to the cache memory is controlled by the on-chip memory control circuit 32, which receives data from data switch 14 through buffer 34, which preferably holds two cache lines.

A DMA transfer to a particular memory address normally requires checking in the L1 cache and the L2 cache to determine if the address is present there. If not, then the data can be read from or written to main memory 16 through data switch 14. In a preferred embodiment, only the L2 cache is checked, since the L1 cache will be a subset of the L2 cache and a mechanism is provided for updating the L1 cache upon a write to a location in the L2 cache which is also in the L1 cache.

Figure 2A:
FIGS. 2A and 2B are timing diagrams showing the transfer of data over the system bus and over a cache bus according to the prior art.

FIG. 2A illustrates the transfer of data over system bus 12. After arbitrating for control of the bus, DMA device 18 will send an address 40 followed by a block of data 42. The address and data are multiplexed over the same bus lines. The bus is then released at a point in time 44. Subsequently, there may be a rearbitration for the bus to transfer more data.

Figure 2B:
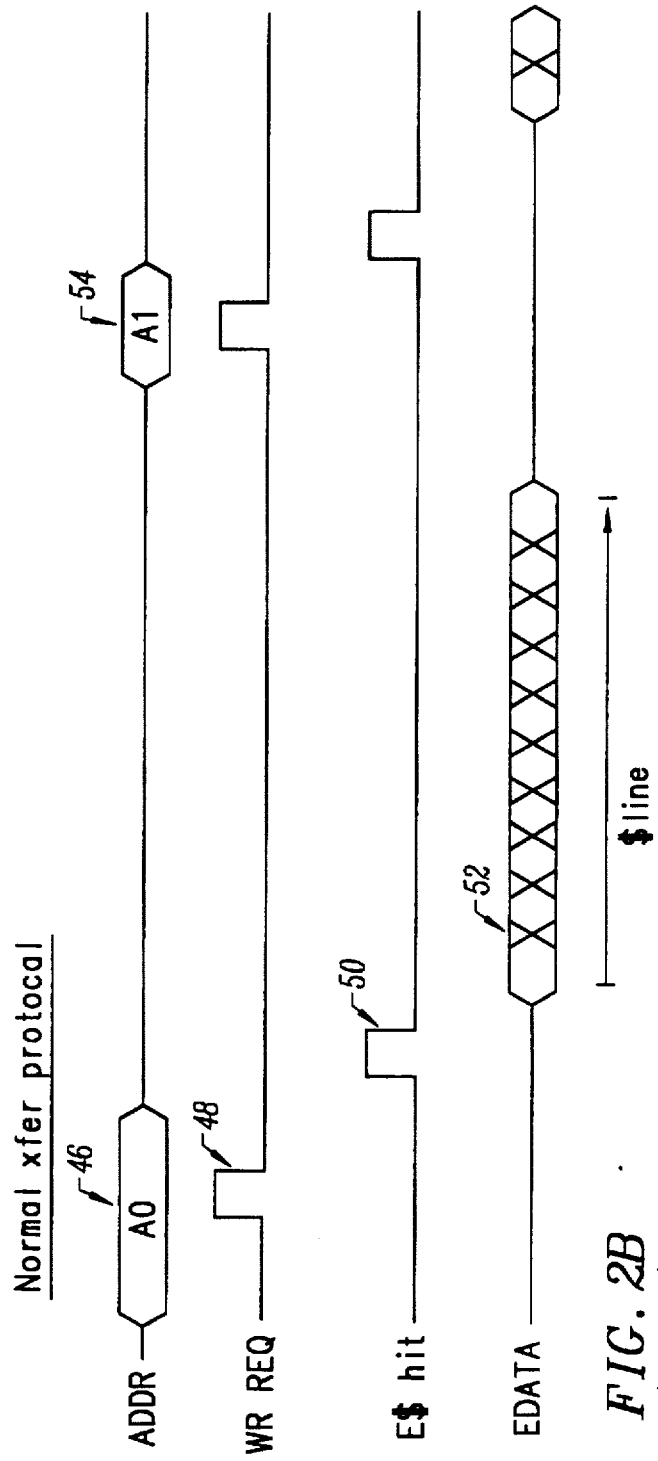

FIG. 2B illustrates a typical prior art response to the receipt of a DMA transfer over the system bus of FIG. 2A. First, the address 46 is activated on an cache ADDR line along with a cache write request control signal 48. If the address is in the cache, a hit signal 50 is returned, and the data 52 can be written to the cache line. When the address is for a next cache line, that address is then asserted as address 54, and the process is repeated. If there is not a hit, the data for that cache line is redirected to main memory.

Figure 3A:
FIGS. 3A and 3B are timing diagrams illustrating the transfer of data over the system bus and cache bus according to one embodiment of the present invention.

FIG. 3A illustrates a transfer over system bus 12 using the present invention. An address 60 is provided after the bus has been arbitrated for, followed by a stream of data 62. Data stream 62 covers the data at subsequent addresses without requiring a transmission of those subsequent addresses. The stream of data can continue until all desired data has been transferred or until the bus is relinquished for certain circumstances described below.

Figure 3B:
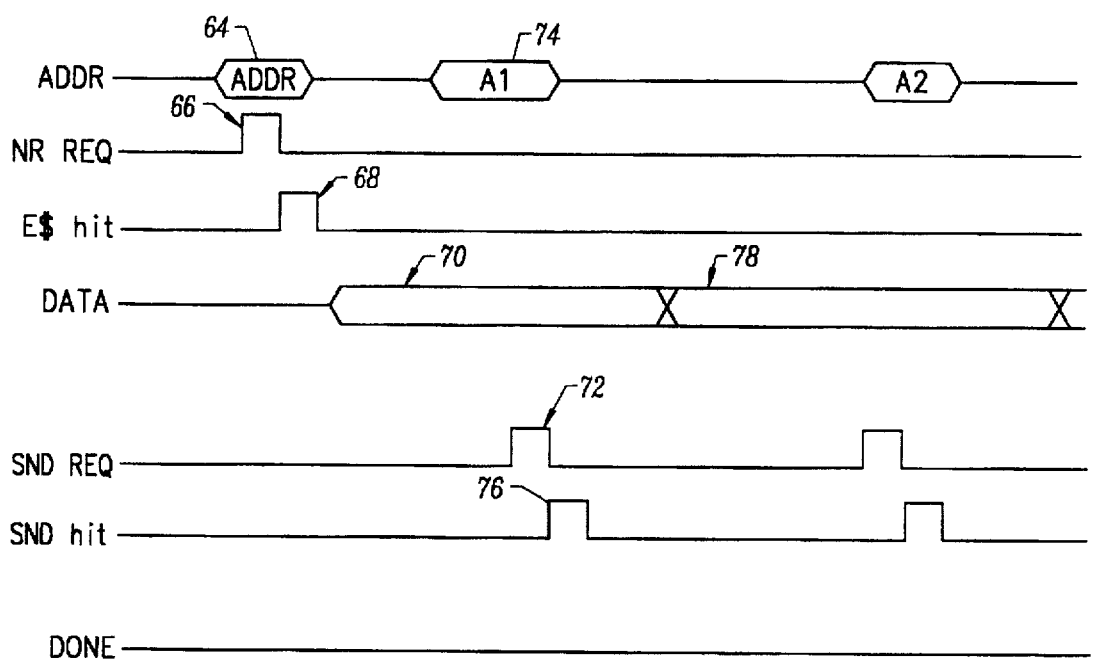

FIG. 3B illustrates the timing of a cache memory access according to the present invention in response to the data stream of FIG. 3A. First, an address 64 is asserted on the cache address bus, as in FIG. 2B. Similarly, a write request control signal 66 is asserted, and a cache hit signal 68 may be received. Upon a cache hit, data 70 is transferred to the cache. Up to this point, the operation is as in the prior art indicated in FIG. 2B.

However, at this point, the present invention issues a snoop request control signal 72 to determine if the next sequential cache line, as indicated by address 74, is present in the cache. If a hit signal 76 is received in response, the next cache line of data 78 is immediately sent to the cache without pausing and subsequently testing for the next address, as in the prior art of FIG. 2B. As can be seen, this facilitates the streaming of data over the system bus to the cache memory. In an alternate embodiment, a bit in software could be used to indicate that the addresses should be decremented, rather than incremented, for the data streaming. Certain specialized applications can take advantage of such a process.

Figure 4:
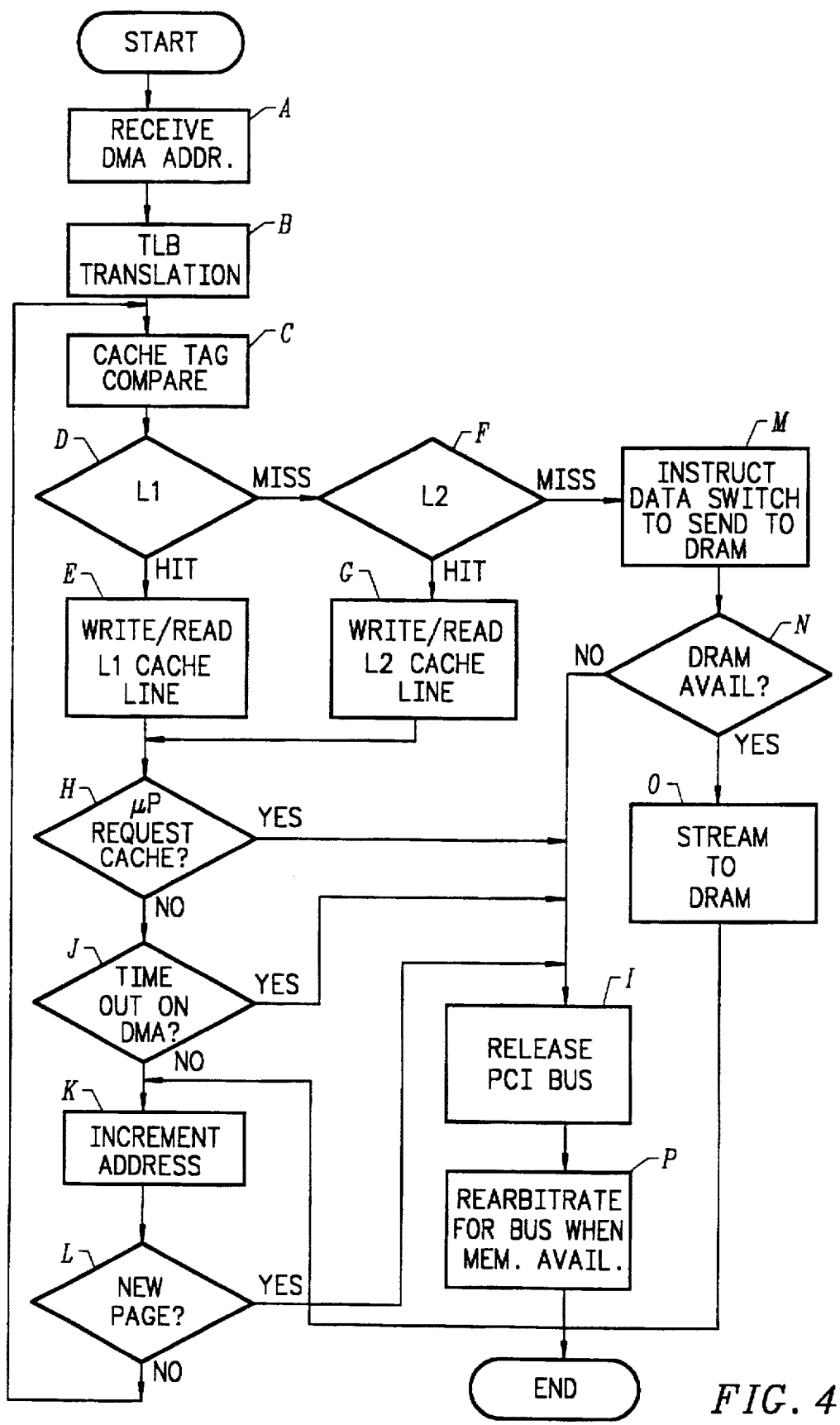
FIG. 4 is a flowchart illustrating one embodiment of the cache snoop method of the present invention.

FIG. 4 is a flowchart illustrating one embodiment of the operation of the present invention. This flowchart is for the embodiment of FIG. 1 showing first and second level caches. In step A, the DMA address is received. In the embodiment of FIG. 1, the DMA address will be a virtual address, while the caches will be tagged with physical addresses. Accordingly, a translation of the address using a translation lookaside buffer (TLB) is then done (step B). Next, the address as translated is compared to the cache tags. If there is a hit in the level 1 cache (step D) the line is accepted, and a read or write, as appropriate, is done to the level 1 cache (step E) (in a preferred embodiment, only a compare to the level 2 cache is done for data streaming). If there is a miss, a compare is done for the level 2 cache (step F). If there is a hit, the data for that line is written or read from the level 2 cache (step G). After the cache write, there is a check done to see if the microprocessor needs the cache on a priority basis (step H). If it does, the system bus is released until the cache is again available (step I). Alternately, or in addition, a test can be done against a timer to determine if the cache has been monopolized for more than a predetermined period of time (step J). This can be done instead of checking a flag in step H for a microprocessor request to allow the microprocessor to access the cache when needed, or can simply be used to put a maximum amount of time to allow other users who are waiting to request and access the cache.

Next, the address is incremented for the next cache line (step K) (alternately, the address may be decremented). A test is done to determine whether this incremented cache line has crossed a page boundary (step L). If the boundary has been crossed, this indicates the need to do a new TLB translation. In one embodiment, it is not efficient to hold onto a system bus while this is done, so the system bus is released (step I) and rearbitrated for after the TLB translation is done. If the page boundary is not crossed, the cache tag compare is done again (step C) for the next cache line, without requiring a new DMA address to be received from the system bus or requiring a new TLB translation.

If there is not a hit in either of the caches, the data transfer must occur with main memory 16 of FIG. 1, and accordingly data switch 14 of FIG. 1 is instructed to direct the data transfer to main memory (step M). The data switch will determine if the DRAM is available (step N). If it is, the data is streamed to the DRAM (step 0). If not, the bus is released until the DRAM is available (step I). The bus is later rearbitrated for when the DRAM (or cache, as applicable) is available (step P). While the cache line data is streaming to the DRAM in step N, the address is incremented (step J), and another cache tag compare is done for the next cache line to determine if it is present. If it is, the data switch is instructed to switch the data back to the cache, and if not, it will continue to stream to the DRAM memory.

Referring back to FIG. 1, typically system bus 12 is slower than the internal microprocessor bus or the dedicated cache bus 22. Accordingly, it typically takes more time for a cache line of buffer 34 to be filled than it takes to write or read the data from the cache memory. Thus, typically, the microprocessor will wait until a cache line is completely filled, and then will quickly read or write that data to the cache memory while the next cache line of buffer 34 is being filled. Because of the difference in bandwidth, this will easily be completed before the next cache line is filled, allowing the microprocessor to perform other operations accessing the cache in the meantime. In addition, the cache line comparison can be done enough in advance that the data would not go to buffer 34 at all if that line is not present in memory, instead data switch 14 being instructed to cut-off the cache line flow and redirect it to DRAM memory 16.

In this manner, buffer 34 may be limited to two cache lines. This is important because of the competing needs for silicon area on the microprocessor. Each cache line not only contains the data and the address, but also contains overhead control data, such as consistency bits to show whether the data is modified, exclusive, shared, etc.

As will be understood by those with skill in the art, the present invention may be embodied in other specific forms without departing from the spirit or essential characteristics thereof. For example, buffer 34 could include only a single cache line, or more than two cache lines. Accordingly, the above description is intended to be illustrative, but not limiting, of the scope of the invention which is set forth in the following claims.

What is claimed is:

1. A method for performing a DMA transfer in a system having a system bus, a main memory, a first and second level cache memory, and a dedicated second level cache bus, comprising the steps of:

performing a cache look-up for a cache line corresponding to a received DMA address;

storing at least 2 cache lines of DMA data in a buffer;

incrementing or decrementing said received DMA address to a next sequential cache line;

comparing said next sequential cache line to tags for a cache;

performing said comparing steps before a transfer for said next sequential cache line over said system bus;

redirecting a next DMA address to said main memory if said speculative cache look-up results in a cache miss;

releasing said system bus if said main memory is in use; and comparing said next sequential cache line address to a page of said DMA address, and releasing said system bus if said page is not identical.

2. A microprocessor comprising:

a system bus I/O connected to a system bus;

a first level instruction cache;

a first level data cache;

a dedicated second level cache bus I/O connected to a second level cache bus;

a main memory bus I/O connected to a main memory bus;

cache look-up logic configured to determine whether a received DMA virtual address is in said caches;

speculative look-up logic configured to cause a speculative look-up of a next sequential cache line;

a buffer configured to store at least two cache lines of DMA data;

redirecting logic configured to issue a command to redirect a DMA access to a main memory upon a speculative cache look-up miss;

page logic configured to compare said next sequential cache line address to a page of said DMA address; and bus release logic configured to release said system bus if said page is not identical to a page of said next sequential cache line address.

3. A computer system comprising:

a system bus;

a DMA device coupled to said system bus;

a main memory; a microprocessor coupled to said system bus, including cache look-up logic configured to determine whether a received DMA address is in a cache, speculative look-up logic configured to cause a speculative look-up of a next sequential cache lines, page logic configured to compare said next sequential cache line address to a page of said DMA address, and bus release logic configured to release said system bus if said page is not identical to a page of said next sequential cache line address;

a first level cache integrated on said microprocessor and a second level cache coupled to said microprocessor by a dedicated cache bus; and a memory bus coupling said memory to said microprocessor.

\* \* \* \* \*